United States Patent
Vote et al.

(10) Patent No.: US 10,037,022 B1
(45) Date of Patent: Jul. 31, 2018

(54) METHODS OF ADJUSTING LAYER PRINT SPEED ON 3D PRINTING MACHINES

(71) Applicant: Thermwood Corporation, Dale, IN (US)

(72) Inventors: Nicolas Vote, Newburgh, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 15/934,573

(22) Filed: Mar. 23, 2018

(51) Int. Cl.
| | |
|---|---|
| *G05B 19/25* | (2006.01) |
| *G05B 19/416* | (2006.01) |
| *G05B 19/414* | (2006.01) |
| *B29C 64/118* | (2017.01) |
| *B33Y 10/00* | (2015.01) |

(52) U.S. Cl.
CPC ......... *G05B 19/416* (2013.01); *B29C 64/118* (2017.08); *G05B 19/4145* (2013.01); *B33Y 10/00* (2014.12)

(58) Field of Classification Search
CPC ..................................................... G05B 19/416
USPC ......................... 318/571, 570, 569, 567, 560
See application file for complete search history.

(56) References Cited

U.S. PATENT DOCUMENTS

2009/0026992 A1\* 1/2009 Tsugaru ............... B41J 13/0027
318/400.37

\* cited by examiner

*Primary Examiner* — David S Luo
(74) *Attorney, Agent, or Firm* — Bookoff McAndrews, PLLC

(57) ABSTRACT

A method for adjusting print speed during an additive manufacturing process may include receiving at an additive manufacturing machine, information including at least a current layer print speed. The method may further include determining a current layer print time based on at least the current layer print speed and adjusting the current layer print speed to an adjusted current layer print speed based on at least the current layer print time and a minimum layer cooling time. Further, the method may include printing a layer of a part at the adjusted current layer print speed.

20 Claims, 5 Drawing Sheets

METHODS OF ADJUSTING LAYER PRINT SPEED ON 3D PRINTING MACHINES

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process commonly referred to as Fused Deposition Modeling (FDM), or Fused Layer Modeling (FLM), comprises melting a thin layer of thermoplastic material, and applying this material in layers to produce a final part. This is commonly accomplished by passing a continuous thin filament of thermoplastic material through a heated nozzle, or by passing thermoplastic material into an extruder, with an attached nozzle, which melts the thermoplastic material and applies it to the structure being printed, building up the structure. The heated material may be applied to the existing structure in layers, melting and fusing with the existing material to produce a solid finished part.

The filament used in the aforementioned process may be produced, for example, by using a plastic extruder. This plastic extruder includes a steel screw configured to rotate inside of a heated steel barrel. Thermoplastic material in the form of small pellets may be introduced into one end of the rotating screw. Friction from the rotating screw, combined with heat from the barrel, may soften the plastic, which may then be forced under pressure through a small round opening in a die that is attached to the front of the extruder barrel. In doing so, a "string" of material may be extruded, after which the extruded "string" of material may be cooled and coiled up for use in a 3D printing machine or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

A common method of additive manufacturing, or 3D printing, generally may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x, y, and z-axes. In some cases, the flowable material, such as, e.g., molten thermoplastic material, may be infused with a reinforcing material (e.g., strands of fiber or a combination of materials) to enhance the material's strength.

The flowable material, while generally hot and pliable, may be deposited upon a substrate (e.g., a mold), pressed down or otherwise flattened to some extent, and leveled to a consistent thickness, preferably by means of a tangentially compensated roller mechanism. The compression roller may be mounted in or on a rotatable carriage, which may be operable to maintain the roller in an orientation tangential, e.g., perpendicular, to the deposited material (e.g., bead or beads). In some embodiments, the compression roller may be smooth and/or solid. The flattening process may aid in fusing a new layer of the flowable material to the previously deposited layer of the flowable material. The deposition process may be repeated so that successive layers of flowable material are deposited upon an existing layer to build up and manufacture a desired component structure. In some instances, an oscillating plate may be used to flatten the bead of flowable material to a desired thickness; thus, effecting fusion to the previously deposited layer of flowable material. The deposition process may be repeated so that successive layers of flowable material are deposited upon an existing layer to build up and manufacture a desired component structure. In order to achieve proper bonding between printed layers, the temperature of the layer being printed upon must be within a certain range. It must be cool enough to have solidified sufficiently to support the pressures generated by the application of the new layer but must also be warm enough to soften and fuse with the new layer.

As a layer is printed, it begins to cool. The rate at which the layer cools depends on a number of factors such as, for example, the thermal characteristics of the material being printed, the temperature at which it is being printed, the ambient temperature of the area where the printing process is being conducted, and air flow. Many of these factors will not necessarily be consistent between different print jobs or even consistent during a single print job. Moreover, each layer of printed material requires a certain amount of time from the time the material is deposited until it has cooled sufficiently to accept (e.g., to appropriately bond with and structurally support) another layer. This amount of time is referred to herein as the "minimum cooling time per layer". Because of the variability of the above factors, the minimum cooling time per layer, even for a specific polymer, can vary.

It is generally desirable to print a part as quickly as possible, and as such, a reduction in the minimum cooling time per layer may be beneficial. In some cases, a 3D printer may be able to print a layer faster than the minimum cooling time per layer. Thus, the minimum cooling time per layer may negatively affect the rate at which the 3D printer can print a part without error. One approach to decrease the time required to produce a part may include printing each layer at a print speed corresponding with the minimum cooling time per layer.

Typical 3D printed parts may have varying geometry at different print heights so that the length of the print bead may be different on different layers. Further, due to the geometric characteristics of the part being printed, different groups of layers within the part may require different amounts of time to cool to a suitable temperature even if all other factors are constant. Therefore, the minimum cooling time per layer may not be the same for every layer of the same part. As such, an ideal print speed required to continuously print a part may differ for different layers.

The speed at which a 3D printing machine, e.g., a CNC machine, operates may be specified within a program (e.g., a CNC program) that defines the motions of the machine required to print a desired part. The program may be developed using a computer system running appropriate software separate from the 3D printing machine. The program may be developed at a location separate from the 3D printing machine, and prior to the intended use of the program. Thus, the exact parameters of the print environment where the program will be executed may not be known when the program is developed. Accordingly, determining optimal print speed for each print layer during the execution of the program may be difficult. To accommodate for a range of different print environments, the program may be developed using nominal parameters and used to determine an approximate print speed recognizing that additional factors encountered during the print process may require print speeds that vary from the programmed print speeds.

Therefore, it may be desirable to adjust the pre-programmed print speed during the print process itself. One method of adjusting the print speed may include adding a feature to a controller of the 3D printing machine which allows the operator to manually vary the speed at which all motions of the 3D printing machine are executed by a fixed amount. But such a method has several drawbacks. First, consistent attention by the operator is required to maintain a proper layer-to-layer cycle time as the size of the printed layers may vary during the print process. Second, certain motions during a start-stop sequence on each layer may require a specific machine speed, and because varying the overall speed of motion for the program may also vary these speeds, the 3D printing machine may not function properly during the start-stop sequence at the adjusted speed.

Another factor that may be considered when adjusting the pre-programmed print speed is the minimum speed at which the 3D printing machine can operate during the print process, e.g., "the minimum print speed." For example, a 3D printing machine may be limited by the mechanical or electrical capabilities of the components (e.g., servomotors) of the 3D printing machine such that the 3D printing machine cannot deposit material slower than a specific rate, e.g., the minimum print speed. On small parts, the 3D printing machine may not be able to print continuously if printing at the minimum print speed completes a layer in less time than is required to sufficiently cool the layer to accept the next layer. In other words, in order to produce a continuously printed part, a print speed of the 3D printing process may not be adjusted to a rate equal to the minimum print speed if the minimum print speed is less than the minimum cooling time per layer. In such a case, a pause may be required to enable sufficient cooling time between layers.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. In one aspect, the present disclosure relates to a method of adjusting layer print speed on 3D printing machines.

In one aspect of the disclosure, a 3D printing machine (e.g., a CNC machine) may receive a minimum cooling time per layer at a controller. Based, at least in part, on the received minimum cooling time per layer, the CNC machine may determine the required print speed to achieve the minimum cooling time for each layer. Next, the controller may adjust an actual print speed to achieve the desired layer-to-layer print time. With such an approach, only the print time needs to be varied leaving other motions (e.g., start-stop or index motions) unchanged.

Also, it may be desirable to allow an operator to adjust the minimum cooling time per layer dynamically without stopping the print process so as to account for any changes in the print environment, which may affect the minimum cooling time per layer. One exemplary method according to the disclosure begins by accessing a CNC program which expediently calculates the time the machine will require to print a layer at a specific print speed. This CNC program may take into account accelerations, decelerations, and fixed speed functions the machine may perform when printing each layer. After accessing the CNC program, information, which may include the minimum cooling time per layer, may be received by the CNC machine. For example the minimum cooling time per layer may be input by the operator manually or determined as a function of the material being printed. Since part geometry may change as additional layers are printed, the minimum cooling time for a layer may be different for separate zones within a part. For example, if a part is generally shaped in the form of a pyramid, the layers near the base of the pyramid may have larger minimum cooling times per layer when compared to layers near the top of the pyramid. Therefore, it may be desirable to define zones of layers and specify a minimum cooling time per layer for each zone. To that end, information which may include operator-specified zones of the part, may be received by the CNC machine.

When a new print program is initiated, the controller of the CNC machine may begin the additive manufacturing process by calculating a print speed for each layer based, at least in part, on the print speed specified in the CNC program and the minimum print cooling time per layer for each specific layer. Optionally, the print speed for each layer may further be based, at least in part, on operator-specified zones of the part to be printed and/or the minimum print time of the CNC machine. The controller may store the calculated print speed for each layer in a list which may be accessed by the controller while executing the CNC program.

To create a layer-by-layer print speed list, the controller may retrieve the current layer print speed specified in the CNC program for the current print layer and, using the current layer print speed, calculate the time machine will require to print the current layer, e.g., the print time. If the print time for a layer is greater than or equal to the minimum cooling time for that particular layer, the current layer print speed is left unchanged and the layer number and current layer print speed are recorded in the layer print speed list.

If, however, the time to print the layer is less than the minimum cooling time per layer, the controller may adjust the print speed by an incremental amount and calculate an adjusted print time at the adjusted print speed for the layer. The controller may then compare the adjusted print time against the minimum cooling time per layer for the layer to assess further adjustment to the print speed. The controller may continue iterations of adjusting the print speed until the print time for the layer is equal to the minimum cooling time per layer. The controller may then record the final calculated print speed in the layer print speed list in place of the print speed originally specified in the CNC print program.

If at any time during the process the print speed of a layer is reduced to less than, or equal to, the minimum print speed the CNC machine is capable of, the process for this layer may be stopped and the minimum print speed for the CNC machine may be recorded as the print speed of the current layer. That is, the print speed of the layer is increased to the minimum print speed for the CNC machine. The controller then performs the same calculations for each layer until a list of print speeds for each layer has been created and stored in a controller of the CNC machine.

In one embodiment according to the present disclosure, a method for adjusting print speed during an additive manufacturing process, the method may include receiving at an additive manufacturing machine, information including at least a current layer print speed. The method may further include determining a current layer print time based on at least the current layer print speed and adjusting the current layer print speed to an adjusted current layer print speed based on at least the current layer print time and a minimum layer cooling time. The method may also include printing a layer of a part at the adjusted current layer print speed.

In an additional or alternative embodiment of the present disclosure, the a method for adjusting print speed during an additive manufacturing process may include receiving at a CNC machine information, a current layer number, a current layer minimum cooling time, and a current layer print speed. The method may include determining a current layer print time based on, at least in part, on the current layer print speed and adjusting the current layer print speed based on, at least in part, the current layer minimum cooling time. The method may also include incrementing the current layer number to generate an incremented layer number and repeating the determining and adjusting steps for the incremented current layer number. Further, the method may include printing a layer at the adjusted current layer print speed.

In an additional or alternative embodiment of the present disclosure, a method for adjusting print speed during an additive manufacturing process may include receiving at a controller of a CNC machine, information relating to at least one layer of a part to be printed, wherein the information includes at least a current layer print speed, wherein the CNC machine includes at least one servomotor, wherein the controller is configured to move a nozzle having an inlet for receiving a flowable material and an outlet for depositing the flowable material to print the at least one layer of the part. The method may include determining a current layer print time for the at least one layer based, at least in part, on the current layer print speed. The method may also include receiving at the controller of CNC machine, a minimum layer cooling time, and a minimum print time based, at least in part, on a mechanical or electrical limitation of the at least one servomotor. The method may further include adjusting the current layer print speed to an adjusted current layer print speed based, at least in part, on the minimum layer cooling time and the minimum print time; and generating a print signal to deposit the flowable material.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components, parts, or articles via additive manufacturing, such as, e.g., via 3D printing. Specifically, the methods and apparatus described herein may be drawn to a method of controlling layer print speeds on 3D printing machines.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
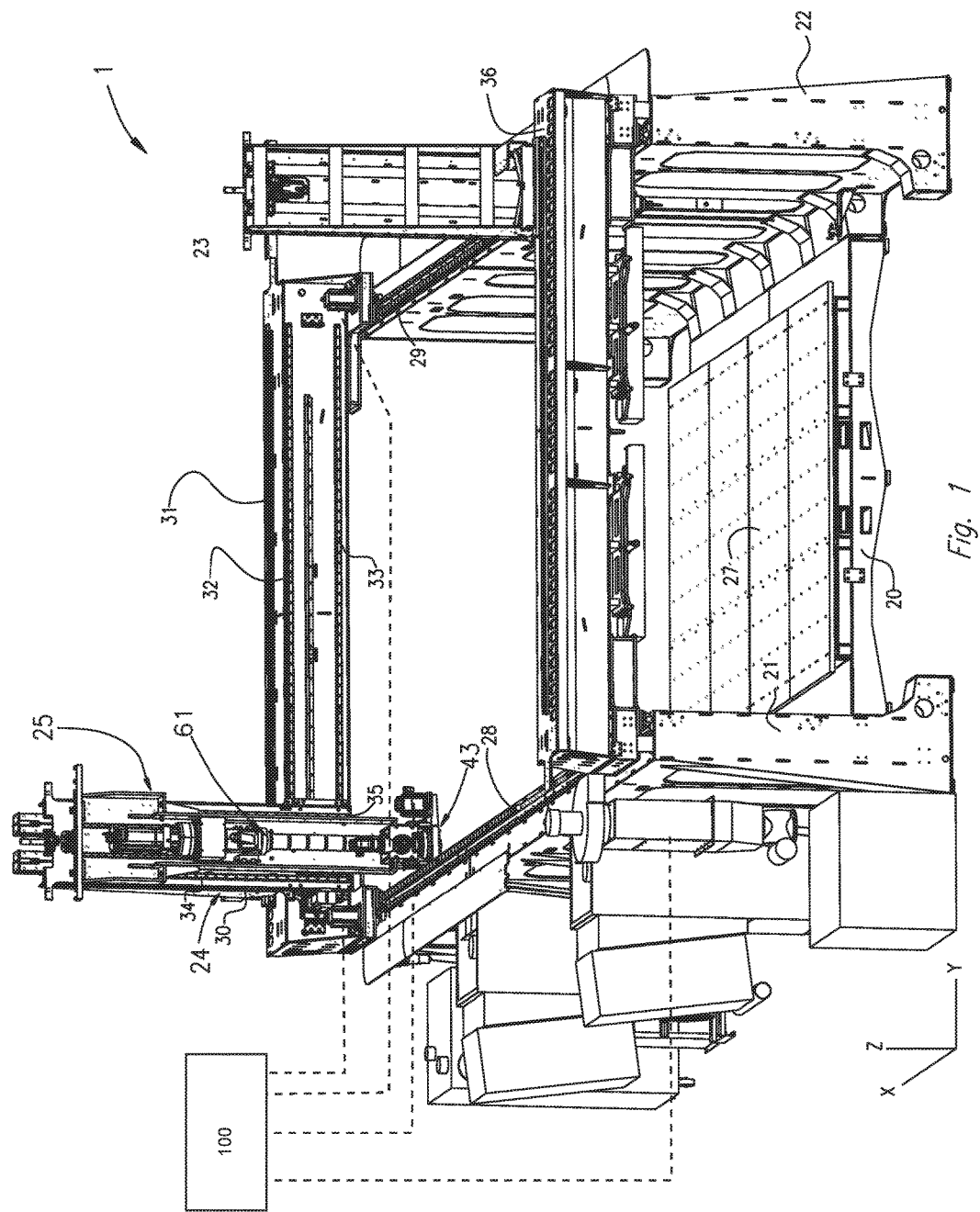
FIG. 1 is a perspective view of an exemplary CNC machine operable pursuant to an additive manufacturing process to form articles or parts, according to an aspect of the present disclosure.

Referring to FIG. 1, there is illustrated a CNC machine 1 embodying aspects of the present disclosure. CNC machine 1 may include a controller 100 schematically illustrated in FIG. 1. Controller 100 may be operatively connected to CNC machine 1 for displacing an applicator nozzle along a longitudinal line of travel, or x-axis, a transverse line of travel, or a y-axis, and a vertical line of travel, or z-axis, in accordance with a program, (e.g., a CNC program) inputted or loaded into controller 100 for performing an additive manufacturing process to form a desired component, as will be described in further detail below. CNC machine 1 may be configured to print or otherwise build 3D parts from digital representations of the 3D parts (e.g., AMF and STL format files) programmed into controller 100.

For example, in an extrusion-based additive manufacturing system (e.g., a 3D printing machine), a 3D part may be printed from a digital representation of the 3D part in a layer-by-layer manner by extruding a flowable material (e.g., thermoplastic material with or without reinforcements). The flowable material may be extruded through an extrusion tip or nozzle carried by a print head of the machine, and the flowable material may be deposited as a sequence of beads or layers on a substrate in an x-y plane. The extruded, flowable material may fuse to a previously deposited layer of material and may solidify upon a drop in temperature. The position of the print head relative to the substrate may then be incrementally advanced along a z-axis (perpendicular to the x-y plane), and the process may then be repeated to form a 3D part resembling the digital representation.

CNC machine 1, as shown in FIG. 1, includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and an applicator assembly (also referred to herein as an applicator head) 43 mounted on carrier 25. Located on bed 20 between side walls 21 and 22 is a worktable 27 provided with a support surface. The support surface may be disposed in an x-y plane and may be fixed, or displaceable, along an x-axis and/or a y-axis. For example, in a displaceable version, worktable 27 may be displaceable along a set of rails mounted to bed 20. Displacement of worktable 27 may be achieved using one or more servomotors and one or more of guide rails 28 and 29 mounted on bed 20 and operatively connected to worktable 27. Printing gantry 23 is disposed along a y-axis, supported on side walls 21 and 22. In FIG. 1, printing gantry 23 is mounted on the set of guide rails 28, 29, which are located along a top surface of side walls 21 and 22.

Printing gantry 23 may either be fixedly or displaceably mounted, and in some aspects, printing gantry 23 may be disposed along an x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32 and 33 provided on printing gantry 23. Carriage 24 may be displaceable along a y-axis on one or more guide rails 31, 32 and 33 by a servomotor mounted on printing gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by a servomotor mounted on carriage 24 and operatively connected to carrier 25.

Figure 2:
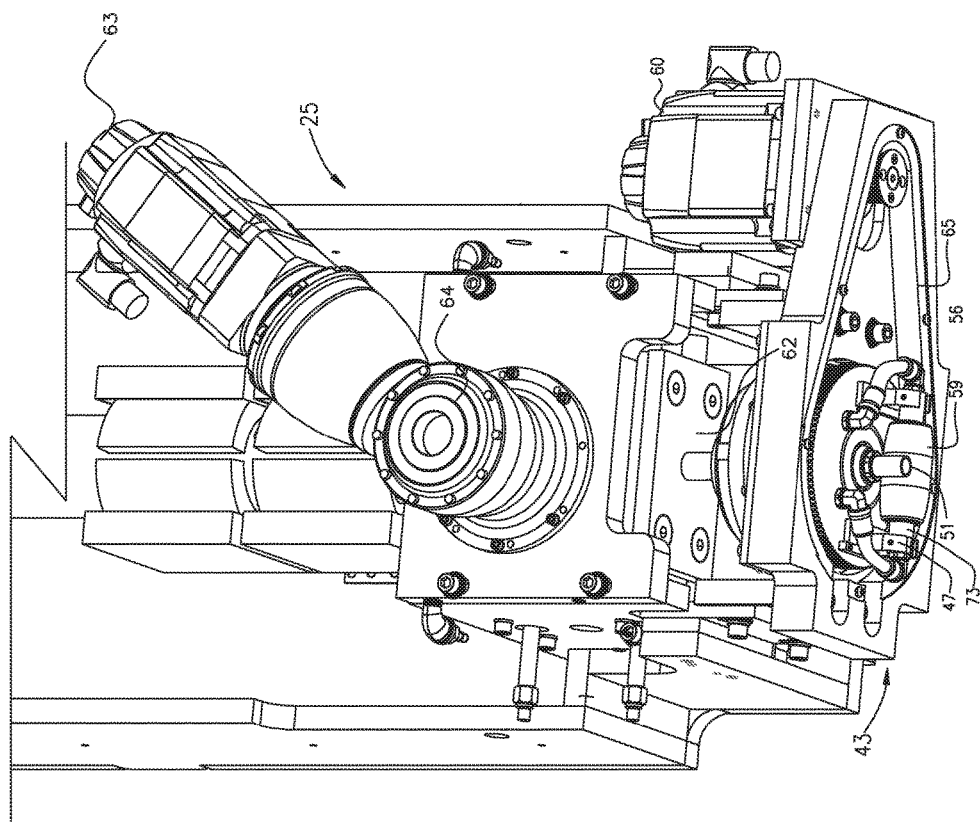
FIG. 2 is an enlarged perspective view of an exemplary carrier and applicator head assembly of the exemplary CNC machine shown in FIG. 1.

As shown in FIG. 2, mounted to the bottom of carrier 25 is a positive displacement gear pump 62, which may be driven by a servomotor 63, through a gearbox 64. Gear pump 62 may receive molten plastic from the extruder 61, shown in FIG. 1.

Figure 3:
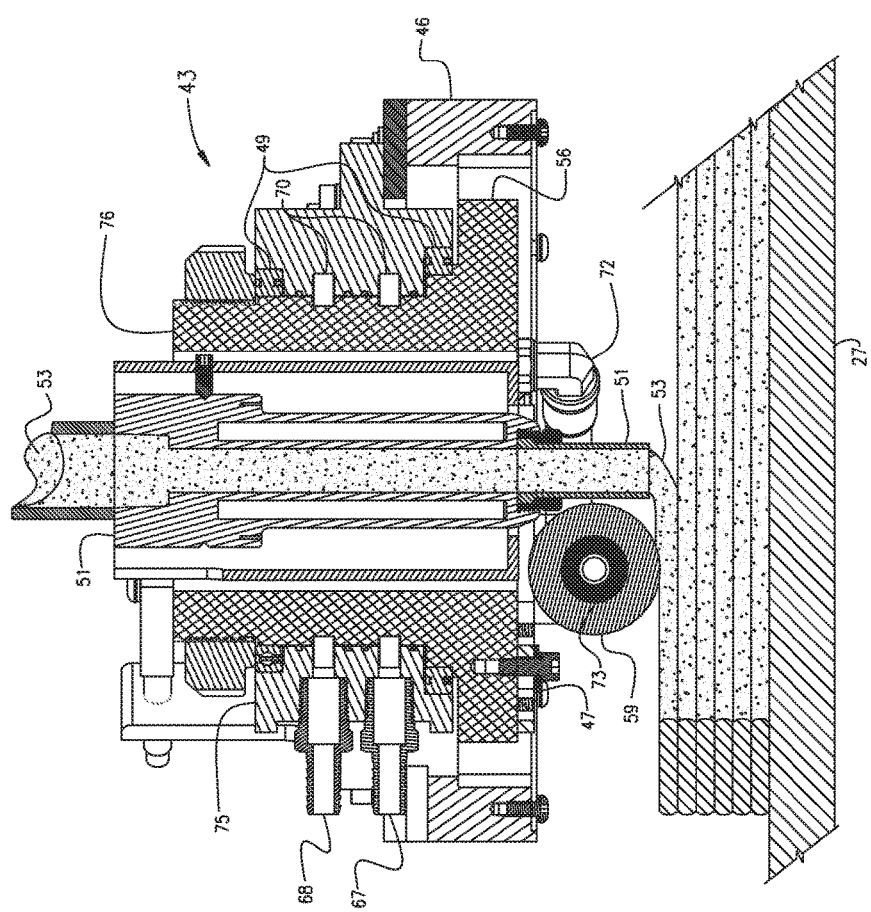
FIGS. 3 and 4 are enlarged cutaway views of the exemplary applicator head assembly shown in FIG. 2.

A compression roller 59, rotatable about a nonrotatable (e.g., fixed) axle 73, for compressing deposited flowable material (e.g., thermoplastic material) may be mounted on a carrier bracket 47. Roller 59 may be movably mounted on carrier bracket 47, for example, rotatably or pivotally mounted. Roller 59 may be mounted so that a center portion of roller 59 is aligned with a nozzle 51, and roller 59 may be oriented tangentially to nozzle 51. Roller 59 may be mounted relative to nozzle 51 so that material, e.g., one or more beads of flowable material (such as thermoplastic resins), discharged from nozzle 51 are smoothed, flattened, leveled, and/or compressed by roller 59, as depicted in FIG. 3. One or more servomotors 60 may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

With continuing reference to FIG. 3, applicator head 43 may include a housing 46 having a rotary union mounted therein. Such a rotary union may include an inner hub 76 rotatably mounted within and relative to an outer housing 75. For example, inner hub 76 may rotate about a longitudinal axis thereof relative to outer housing 75 via one or more roller bearings 49. Carrier bracket 47 may be mounted, e.g., fixedly mounted to inner hub 76, journaled in roller bearing 49. Roller bearing 49 may allow roller 59 to rotate about nozzle 51.

As shown in FIG. 3, an oversized molten bead of a flowable material 53 (e.g., a thermoplastic material) under pressure from a source disposed on carrier 25 (e.g., one or more of extruder 61 and an associated polymer or gear pump) may be flowed to applicator head 43, which may be fixedly (or removably) connected to, and in communication with nozzle 51. In use, flowable material 53 (e.g., melted thermoplastic material) may be heated sufficiently to form a large molten bead thereof, which may be delivered through applicator nozzle 51 to form multiple rows of deposited material 53 on a surface of worktable 27. In some embodiments, beads of molten material deposited by nozzle 51 may be substantially round in shape prior to being compressed by roller 59. Exemplary large beads may range in size from approximately 0.4 inches to over 1 inch in diameter. For example, a 0.5 inch bead may be deposited by nozzle 51 and then flattened by roller 59 to a layer approximately 0.2 inches thick by approximately 0.83 inches wide. Such large beads of molten material may be flattened, leveled, smoothed, and/or fused to adjoining layers by roller 59.

Although roller 59 is depicted as being integral with applicator head 43, roller 59 may be separate and discrete from applicator head 43. In some embodiments, roller 59 may be removably mounted to CNC machine 1. For example, different sized or shaped rollers 59 may be interchangeably mounted on CNC machine 1, depending, e.g., on the type of flowable material 53 and/or desired characteristics of the rows of deposited flowable material formed on worktable 27.

In some embodiments, CNC machine 1 may include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller 100 coupled to CNC machine 1, which then may utilize the received information to compensate for variations in the material flow rates.

In the course of fabricating an article or component, pursuant to the methods described herein, controller 100 of CNC machine 1, in executing the inputted program, may control several servomotors described above to displace gantry 23 along the x-axis, displace carriage 24 along the y-axis, displace carrier 25 along the z-axis, and/or rotate carrier bracket 47 about the z-axis while nozzle 51 deposits flowable material 53 and roller 59 compresses the deposited material. In some embodiments, roller 59 may compress flowable material 53 in uniform, smooth rows.

A circumferential outer surface of inner hub 76 may include or define pulley 56. For example, as shown in FIG. 3, pulley 56 may include a radially outward-most portion of inner hub 76. Although pulley 56 is depicted as being integral with inner hub 76, pulley 56 may be separate and discrete from inner hub 76. Additionally, inner hub 76 may include an opening having a dimension (e.g., diameter) sufficient to allow nozzle 51 to pass therethrough.

Figure 4:
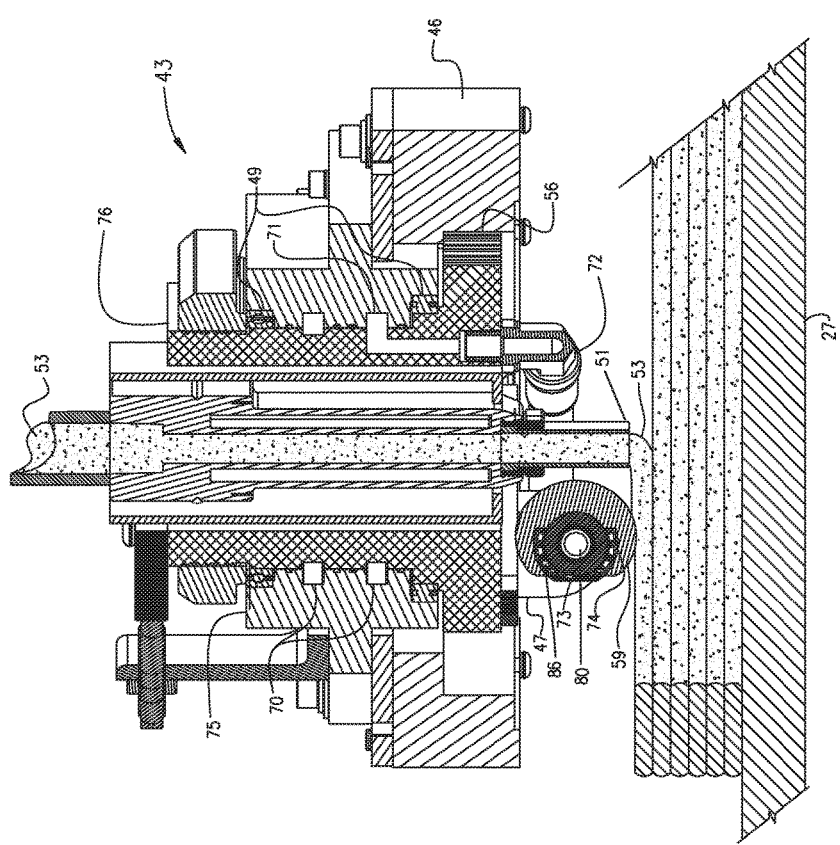

Outer housing 75 may include one or more barb fittings 67, 68. Coolant may enter a barb fitting 67 and may be introduced inside of housing 46 of applicator head 43. Each barb fitting 67 may be fluidly coupled to one or more passages extending through applicator head 43. For example, each of barb fittings 67 and 68 may be coupled to one or more coolant passages 70. As shown in FIGS. 3 and 4, coolant passages 70 may extend between outer housing 75 and inner hub 76. Additionally, coolant passages 70 may couple to one or more passages 71 and quick connect fitting 72, as shown in FIG. 4. Quick connect fitting 72, in turn, may be fluidly coupled to an interior bore, passage, or lumen extending through the axle 73 so as to directly cool the axle 73, and thereby, roller 59. Each of coolant passages 70 and passages 71 may be disposed within applicator head 43 to direct the coolant within applicator head 43 during operation of CNC machine 1, e.g., when printing a part. As shown in FIGS. 3 and 4, for example, each of coolant passages 70 may extend along an axis generally perpendicular to the longitudinal axis of nozzle 51 while passages 71 may extend generally parallel with the longitudinal axis of nozzle 51. It is understood, however, that the disclosure is not so limited. Any or all of coolant passages 70 and/or passages 71 may extend along an axis nonparallel or nonperpendicular to the longitudinal axis of nozzle 51.

Regardless of the configuration, orientation, shape, or arrangement thereof, barb fitting 67, coolant passage 70, passage 71, quick connect fitting 72, axle 73, and barb fitting 68 may collectively form a cooling circuit for cycling or otherwise introducing and removing coolant from applicator head 43. For example, an inlet portion of barb fitting 67 may be fluidly connected to a source of coolant (not shown). Once within applicator head 43, the coolant may absorb heat and may cool outer housing 75, inner hub 76, and axle 73 as it flows therethrough. In addition, due to the proximity of roller 59 to axle 73, passage of coolant through axle 73 may result in likewise cooling of roller 59. The coolant may exit from one or more barb fittings 68 and may return to a chiller to be cooled back down to an appropriate temperature. The coolant may be cooled down to a temperature below that at which deposited material 53 may begin to adhere to roller 59. This temperature may vary depending on the type of material 53 used and may be below the melting point of that material. In some examples, the coolant may be a liquid coolant, such as, e.g., water, antifreeze, ethylene glycol, diethylene glycol, propylene glycol, betaine, or any other suitable liquid coolants or combinations thereof.

As shown in FIG. 4, axle 73 passes through a central lumen 80 of roller 59. Additionally, one or more low friction bearing(s) 74 may be located at each end of the roller 59 so as to provide a rotational mounting between the axle 73 and the roller 59, thereby allowing the roller 59 to rotate about the axle 73, without the axle 73 contacting roller 59. A thin layer of air may exist in a gap between an outer surface of the axle 73 and a surface of the lumen 80 of roller 59 such that it is possible to cool the compression roller 59 while maintaining nearly friction free rotation of roller 59. Additionally, the gap between the axle 73 and the compression roller 59 may be filled with a material with better heat transfer properties than air. For example, a material such as atomized copper powder may be positioned in the gap. As an alternative, a low viscosity material such as copper filled anti-seize compound may be positioned in the gap 86. Such materials may impart only a slight increase in rotational friction between the axle 73 and the compression roller 59, while offering a dramatic increase in heat transfer properties, thereby permitting heat transfer between the compression roller 59 and the axle 73.

As mentioned above, the contemplated additive manufacturing process may be adjusted to reduce the time required to print a part. For example, the manufacturing process may be modified to increase the printing speed per layer—correspondingly reducing the print time per layer, and thus per part. Further revisions to the manufacturing process may be made to prevent or decrease delays. For example, such revisions may include adjusting print speed based on the minimum print speed or the minimum cooling time per layer. The additive manufacturing process may be adjusted based, at least in part, on additional information received at the CNC machine 1 (e.g., at the controller 100 of the CNC machine 1).

The information received at the CNC machine 1 may include a CNC program and/or a printing program. The information may further include, at least one of a total part print time, a print speed (e.g., a current layer print speed), a layer print time, a layer number, a number of total layers, a layer tool path, a minimum cooling time of a layer, a minimum print speed, a density/quantity of a print bead, or a type printing material. Additional information may further include environmental factors such as, for example, an environmental temperature, moisture content of the environment air, environment altitude, etc. Such information may be received via one or more sensors associated within the CNC machine 1 and/or environment. In some aspects of the disclosure, information may be input by an operator.

The CNC machine 1 may calculate certain specifications of the manufacturing process based, at least in part, on information received or stored at the CNC machine 1. For example, the layer print time may be calculated based in part on the layer print speed and, additionally or alternatively, the layer tool path. As mentioned above, the minimum cooling time per layer may change in response to changes in certain parameters of the printing process, such as, for example, the printing material, the environment surrounding the manufacturing process, and/or the geometry of the part being printed. Thus, the CNC machine 1 may determine the minimum cooling time per layer based on one or more of these parameters.

In response to changes to the specifications of the printing process, the CNC machine 1 may alter aspects of the contemplated manufacturing process, e.g., the print speed. In some examples, the print speed may be adjusted (e.g., increased or decreased) based, at least in part, on a comparison between the layer print time and the minimum cooling time per layer. As described above, aspects of the manufacturing process may be adjusted as a result of comparing the print speed to the minimum print speed (e.g., the print speed may be increased if the print speed is less than the minimum print speed). Any alterations to the printing process (e.g., adjustments to the print speed) may be recorded by the CNC machine 1 and stored in an appropriate memory of the CNC machine 1.

The CNC machine 1 may record any modified parameters of the printing process in order to execute the printing process according to the modified parameters. For example, the CNC machine 1 may adjust the print speed for at least one layer in a CNC program, adding each adjusted print speed, and corresponding layer number, to a print speed list. The CNC machine 1 may adjust print speeds layer by layer, e.g., adjusting the print speed for one layer, incrementing the current layer number, receiving a new print speed corresponding to the incremented layer, and adjusting the new print speed. After recording some or all modifications to the parameters of the printing process the CNC machine 1 may begin the printing process using the modified parameters. For example, the CNC machine 1 may create a print speed list including a print speed for each layer, and then begin the printing process according to the print speeds recorded in the print speed list. In this manner, the print speed for one or more layers may be modified in order to reduce the print time per part. The description below provides an exemplary method for controlling the print time of a layer on a 3D printing machine to accommodate for factors such as the minimum cooling timer per layer and the current layer print time.

As described to above, there are multiple methods for changing print speed to accommodate for changes in the printing process. In one aspect of the present disclosure, the CNC machine 1 may receive a print speed from a CNC program, calculate a layer print time based in part on the print speed, and reduce the print speed if the layer print time is less than the minimum cooling time per layer, and, additionally or alternatively, increase the print speed if the print speed is less than the minimum print speed. Then, the CNC machine 1 may add the adjusted current print speed and the current layer number to the layer print speed list. The CNC machine 1 may repeat the process to adjust a print speed corresponding to each layer in the CNC program, thus producing a print speed list having a print speed for each layer. After completing the print speed list, the CNC machine 1 may print the part by printing each layer at the print speed specified by the print speed list for each layer.

Figure 5:
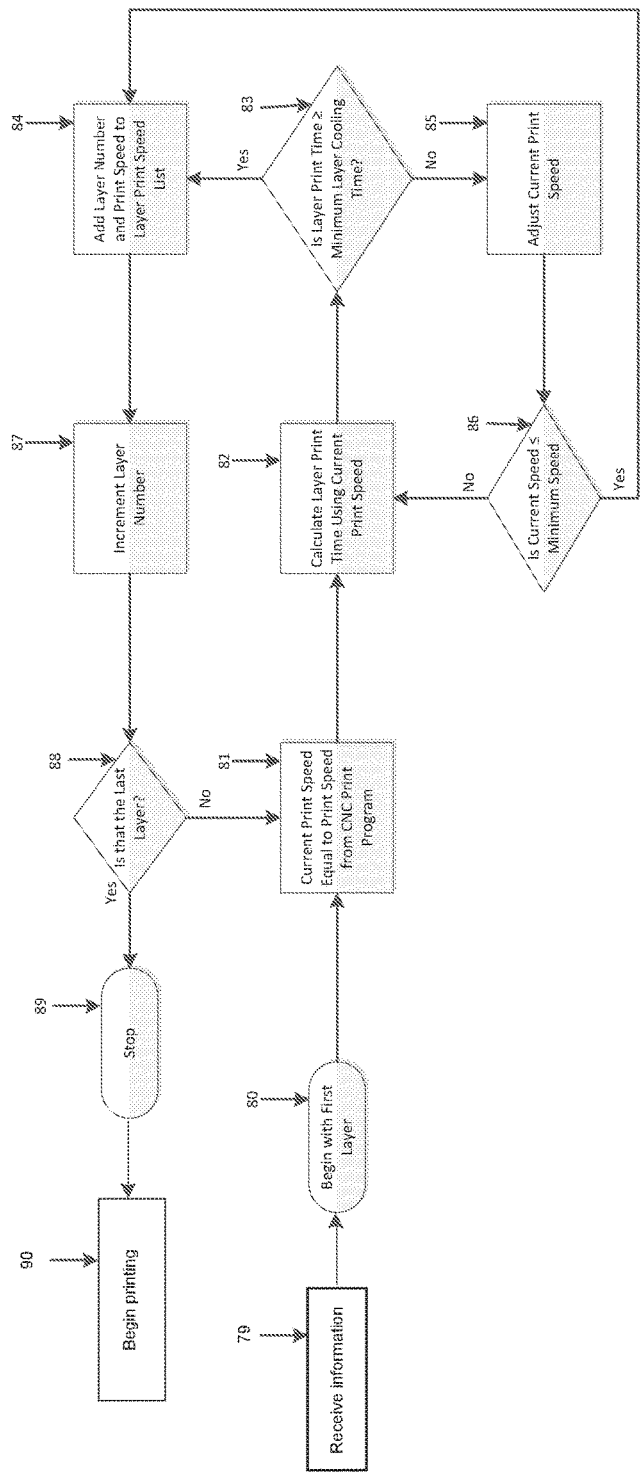
FIG. 5 depicts a flow chart of an exemplary method for controlling layer print time.

FIG. 5 depicts an exemplary method of adjusting the print speed of an additive manufacturing process of a 3D printing machine. The exemplary method may begin by receiving information at the CNC machine 1, e.g., at controller 100 at step 79. As noted above, the information may include any one or more of a printing program, a total part print time, a print speed (e.g., a current layer print speed), a layer print time, a layer number, a number of total layers, a layer tool path, a minimum cooling time of a layer, a minimum print speed, operator-specified zones of the part to be printed, a bead density/quantity of printing material, and/or a printing material type. The minimum cooling time per layer may be input by the operator or controller 100 may determine the minimum cooling time per layer as a function of the material being printed. After receiving the information, controller 100 may index to a first (e.g., current) layer at step 80, and at step 81, may begin developing a layer print speed list by retrieving and setting the current print speed corresponding to the current (e.g., first) layer equal to the value specified in the CNC program. Next, controller 100 may calculate the layer print time based, at least in part, on the current print speed at step 82. At step 83, controller 100 may compare the current layer print time with the minimum cooling time per layer. If the layer print time for the current layer is greater than or equal to the minimum cooling time for the current layer, the layer print time may be left unchanged and the current layer number and current print speed may be recorded in the layer print speed list at step 84. If, however, the current layer print time is less than the minimum cooling time per layer, controller 100 may adjust (e.g., reduce) the current layer print speed by an incremental amount at step 85 to generate an adjusted current layer print speed. Next, controller 100 may compare the adjusted current layer print speed with the minimum speed of the CNC machine 1 at step 86. If the adjusted current print speed is greater than the minimum speed of the CNC machine 1, controller 100 may recalculate the layer print time using the adjusted current layer print speed and return to step 82. If the adjusted current layer print speed is less than or equal to minimum speed the CNC machine 1 is capable of, the process for this layer may stop and the minimum print speed and current layer number may be recorded (e.g., in a memory of controller 100) for the current layer at step 84. Once the print speed of the current layer has been added to the layer print speed list at step 84, the layer number may be incremented at step 87. At step 88, controller 100 may compare the current layer number to the last layer number in the CNC program. If the incremented layer number is the last layer number, controller 100 may stop generating the layer print speed list at step 89. If the incremented layer number is not the last layer number in the CNC program, the process may start over by retrieving the layer print speed specified in the CNC program for the incremented layer at step 81. Once the layer print speed list has been completed at step 89, the CNC machine 1 may begin printing (e.g., by sending a print signal to controller 100 to execute the printing program and deposit flowable material) at step 90. While steps 79-90 are depicted and described in a particular order, the principles of the present disclosure are not limited to the order depicted in FIG. 5. Rather, in some aspects of the present disclosure, a current layer print speed may first be compared to the minimum speed of the CNC machine 1, and then compared to the minimum layer cooling time.

In some aspects of the disclosure, if the methods described herein are operating on controller 100 while the CNC machine 1 is printing, controller 100 may signal the CNC machine 1 to print the layer using the print speed specified in the layer print speed list instead of the print speed specified in the CNC program for that layer. After printing a layer, controller 100 may determine that the layer was printed in less time than the minimum cooling time per layer and, instead of starting to print a new layer, controller 100 may invoke a programmed routine to move the print head of CNC machine 1 to a parking or rest area where the print head continues operating at a slow speed (e.g., the minimum print speed) to keep the CNC machine 1 properly primed while the most recently deposited layer cools. The CNC machine 1 may remain in this state until the minimum cooling time per layer has passed after which the CNC machine 1 may resume the printing process. For example, a layer may be printed at the minimum print speed, but the controller 100 may determine that the layer was printed in less time than the minimum cooling time per layer and therefore invoke the aforementioned programmed routine. That is, upon controller 100 making a determination that a layer was deposited too quickly such that the an amount of time from the time the layer was deposited until it will have cooled adequately to accept (e.g., to appropriately bond with and structurally support) another layer is insufficient, controller 100 may direct or instruct the print head to a location apart from the article or part being printed. When so directed, the print head will continue to expel material at the parking or rest area while waiting for the minimum cooling time for the previously deposited layer to be reached, this maintaining the print head in a state of readiness. Then, when the minimum cooling time for the previously deposited layer has been reached, controller 100 may direct or instruct the print head to return to the article or part being printed and to continue with the printing process by printing the next layer of the article or part.

In additional or alternative aspects of the disclosure, the CNC machine 1 may begin printing before at least part of the layer print speed list is adjusted and/or completed. For example, the CNC machine 1 may begin printing a part layer-by-layer after the layer print speed list includes at least one print speed. The CNC machine 1 may print a layer once the print speed specified for that layer is included in the layer print speed list. If a print speed is not yet specified in the layer print speed list for the current layer, the controller 100 may invoke a programmed routine, as described above, to move the print head to a parking or rest area before printing the current layer. The CNC machine 1 may remain in the programmed routine until the layer print speed specified for the current layer is included in the layer print speed list.

In additional or alternative aspects of the disclosure, while the CNC machine 1 is printing, if the operator changes the value for the minimum cooling time for a layer, the controller, using the above described methods, may modify the values in the layer print speed list for all layers that have not yet been printed, at which point CNC machine 1 may begin using the modified values in the print speed list at the beginning of the next layer.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A method for adjusting print speed during an additive manufacturing process, the method comprising:
   receiving at an additive manufacturing machine, information including at least a current layer print speed;
   determining a current layer print time based on at least the current layer print speed;
   adjusting the current layer print speed to an adjusted current layer print speed based on at least the current layer print time and a minimum layer cooling time; and
   printing a layer of a part at the adjusted current layer print speed.

2. The method of claim 1, wherein adjusting the current layer print speed includes increasing the current layer print speed.

3. The method of claim 1, wherein adjusting the current layer print speed includes decreasing the current layer print speed.

4. The method of claim 1, wherein the minimum layer cooling time is based, at least in part, on a material being printed.

5. The method of claim 1, further including:
   recording the adjusted current layer print speed and a layer number to a layer print speed list.

6. The method of claim 5, further including:
   repeating the determining step for each layer of a plurality of layers in a printing program.

7. The method of claim 6, wherein the current layer print speed has a first value for a first layer of the plurality of layers and a second value for a second layer of the plurality of layers, wherein the first value is different than the second value.

8. The method of claim 1, further including:
   comparing the current layer print time with the minimum layer cooling time; and
   pausing printing of the layer of the part if the current layer print time is less than the minimum layer cooling time.

9. A method for adjusting print speed during an additive manufacturing process, the method comprising:
   receiving at a computer numeric controlled (CNC) machine, information including a current layer number, a current layer minimum cooling time, and a current layer print speed;
   determining a current layer print time based on at least the current layer print speed;
   adjusting the current layer print speed to an adjusted current layer print speed based on at least the current layer minimum cooling time;
   incrementing the current layer number to generate an incremented layer number;
   repeating the determining and adjusting steps for the incremented current layer number; and
   printing a layer at the adjusted current layer print speed.

10. The method of claim 9, further including:
    comparing the incremented layer number with a total number of layers in a CNC program; and
    if the incremented layer number is greater than the total number of layers, the method for controlling print speed is stopped.

11. The method of claim 9, further including:
    recording the adjusted current layer print speed and the current layer number in a layer print speed list.

12. The method of claim 9, further including:
    comparing the current layer print speed to a minimum print speed, and if the current layer print speed is less than the minimum print speed, the current layer print speed is reset as the minimum print speed.

13. The method of claim 9, wherein the current layer minimum cooling time is a function of a material used for printing in the additive manufacturing process.

14. The method of claim 9, wherein the current layer minimum cooling time is a function of a geometry of a layer of a plurality of layers.

15. The method of claim 14, further including:
    determining the current layer minimum cooling time based, at least in part, on an environmental temperature, an environmental moisture content, an environment altitude, or a combination thereof.

16. A method for adjusting print speed during an additive manufacturing process, the method comprising:
    receiving at a controller of a computer numeric controlled (CNC) machine, information relating to at least one layer of a part to be printed, wherein the information includes at least a current layer print speed, wherein the CNC machine includes at least one servomotor, wherein the controller is configured to move a nozzle having an inlet for receiving a flowable material and an outlet for depositing the flowable material to print the at least one layer of the part;
    determining a current layer print time for the at least one layer based, at least in part, on the current layer print speed;
    receiving at the controller of CNC machine, a minimum layer cooling time;
    receiving at the controller of CNC machine, a minimum print time based, at least in part, on a mechanical or electrical limitation of the at least one servomotor;
    adjusting the current layer print speed to an adjusted current layer print speed based, at least in part, on the minimum layer cooling time and the minimum print time; and
    generating a print signal to deposit the flowable material.

17. The method of claim 16, wherein the flowable material is deposited at the adjusted current layer print speed.

18. The method of claim 16, further including:
recording a current layer number and the adjusted current layer print speed to a layer print speed list.

19. The method of claim 18, further including:
repeating the determining and adjusting steps for each layer of a plurality of layers in a printing program.

20. The method of claim 16, further including:
determining the current layer print time based, at least in part, on a tool path.

* * * * *